United States Patent
Thetford

(10) Patent No.: US 6,599,947 B2
(45) Date of Patent: *Jul. 29, 2003

(54) DISPERSANTS

(75) Inventor: Dean Thetford, Manchester (GB)

(73) Assignee: Avecia Limited, Blackley (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/647,319

(22) PCT Filed: Mar. 15, 1999

(86) PCT No.: PCT/GB99/00773

§ 371 (c)(1),
(2), (4) Date: Oct. 28, 2000

(87) PCT Pub. No.: WO99/49963

PCT Pub. Date: Oct. 7, 1999

(65) Prior Publication Data

US 2003/0027873 A1 Feb. 6, 2003

(30) Foreign Application Priority Data

Mar. 28, 1998 (GB) .............................................. 9806723

(51) Int. Cl.[7] .......................... B01F 17/00; C08L 67/00; C09D 11/00
(52) U.S. Cl. ...................... 516/31; 106/31.67; 524/309; 524/311; 524/539; 524/599; 528/287; 528/293; 528/354
(58) Field of Search ............................ 516/31; 106/504, 106/31.35, 31.67; 524/539, 599, 306, 307, 309, 311; 528/354, 332, 356, 363, 364, 287, 293; 525/450

(56) References Cited

U.S. PATENT DOCUMENTS 4,861,380 A * 8/1989 Campbell et al. ........... 106/504
5,395,743 A * 3/1995 Brick et al. ............. 428/694 B
5,418,101 A * 5/1995 Holmes et al. ................ 430/56
6,197,877 B1 * 3/2001 Thetford et al. ............ 524/539

FOREIGN PATENT DOCUMENTS

| EP | 551 766 | 7/1993 | |
| EP | 713 894 | 5/1996 | |
| JP | 07-207012 | * 8/1995 | |
| JP | 8-10601 | 1/1996 | ........... B01F/17/52 |
| WO | WO 94 00508 | 1/1994 | |
| WO | WO 94/21368 | * 9/1994 | |
| WO | WO 98/19784 | * 5/1998 | |

OTHER PUBLICATIONS

Machine translation of JP 07–207012, Japanese Patent Office, http://www1.ipdl.jpo.go.jp/PA1/cgi–bin/PA1DETAIL, Sep. 2002.*
Webster's II new Riverside university dictionary, (Houghton Mifflin Co., Boston, MA, copyright 1984) 1984 (month unavailable), p. 634.*
Derwent Patent Abstract for JP 08010601 (Daicel Chem. Ind Ltd) AN–1996–110848X week 199612.

* cited by examiner

Primary Examiner—Daniel S. Metzmaier
(74) Attorney, Agent, or Firm—Pillsbury Winthrop LLP

(57) ABSTRACT

A dispersant of formula 1

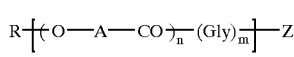

(1)

wherein R is hydrogen or a polymerisation termination group; Z is an acidic or basic group or a moiety containing either an acidic or basic group; A is $C_{3-7}$alkylene optionally substituted by alkyl; Gly is oxymethylenecarbonyl; n and m are integers; and n+m is from 2 to 100. The dispersants are used to disperse particulate solids such as pigments in paints and inks. Examples of the dispersants include mixed polyester chains derived from ε-caprolactone and/or δ-valerolactone with glycolic acid where the mixed polyester chain is reacted with either a polyalkyleneimine or with a phosphating agent.

11 Claims, No Drawings

DISPERSANTS

This application is the national phase of international application PCT/GB99/00773 filed Mar. 15, 1999 which designated the U.S.

This invention relates to a new class of dispersants, to dispersions containing such dispersants together with a particulate solid and an organic medium, to millbases and the use of such dispersions and millbases in paints and printing inks.

Dispersants containing a poly(oxypentamethylene carbonyl) chain are well known and are generally prepared by polymerisation involving ε-caprolactone. They are said to be particularly useful for dispersing particulate solids in an organic liquid media and contain either acid or basic terminating groups. Dispersants containing terminal basic groups are described in EP 208041 and WO94/21368 and include the reaction products of poly(ethyleneimine) with ε-caprolactone in the presence of aliphatic or hydroxy-aliphatic carboxyl acids as chain terminators during the polymerisation of the ε-caprolactone. Dispersants containing terminal acid groups are described in EP 164817 and include phosphate esters of ε-caprolactone polymerised in the presence of a fatty alcohol as chain terminator.

It has now been found that superior dispersants can be made by partially replacing the ε-caprolactone used in the preparation of such dispersants by glycolic acid. Dispersants derived from block or random copolymerisation of glycolic acid with ε-caprolactone and/or δ-valerolactone have been found particularly advantageous.

According to the invention there is provided a dispersant of general Formula 1.

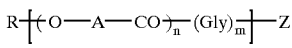
(1)

wherein:
R is hydrogen or a polymerisation terminating group;
Z is an acidic or basic group or a moiety containing either an acidic or basic group;
A is $C_{3-7}$-alkylene optionally substituted by alkyl;
Gly is oxymethylenecarbonyl;
n and m are integers; and
n+m is from 2 to 100;
including salts thereof.

The dispersant of formula 1 is hereinafter referred to as "The Dispersant".

Preferably n+m is not greater than 70, more preferably not greater than 50 and especially not greater than 20.
The poly (oxyalkylene carbonyl) chain (hereinafter POAC chain) represented by $-[(O-A-CO)_n(Gly)_m]-$ may be a random or block copolymer.

The poly(oxyalkylene carbonyl) chain represented by $-(O-A-CO)_n-$ is preferably derivable from propiolactone, δ-valerolactone, ε-caprolactone or alkyl-substituted ε-caprolactone, including mixtures thereof. The preferred lactones are ε-caprolactone and δ-valerolactone.

The oxymethylenecarbonyl group represented by Gly is preferably derived from glycolic acid.

When Z is a basic group or moiety containing a basic group, it is preferably a polyamine or polyimine.

It is preferred that the ratio of n to m is between 30:1 and 1:6, more preferably between 20:1 and 1:5, even more preferably between 10:1 and 1:5 and especially between 10:1 and 1:1. Preferably, the MW of the polyester chain represented by $R-[(O-A-CO)_n(Gly)_m]-$ is from 600 to 3,000. It is also preferred that the MW of the polyester chain is not less than 800 and especially not less than 1,000.

When Z is polyfunctional, there may be more than one group $R-[(O-A-CO)_n(Gly)_m]-$ attached to each Z.

The alkyl group(s) in ε-caprolactone may be linear or branched and is preferably $C_{1-8}$-alkyl, more preferably $C_{1-6}$-alkyl and especially $C_{1-4}$-alkyl. Examples of such groups are methyl and t-butyl.

The alkyl substituted ε-caprolactones are obtainable by oxidation of alkyl substituted cyclohexanone and consequently many are mixtures of alkyl substituted ε-caprolactone. Thus, the oxidation of 2-methyl cyclohexanone often results in a mixture of 7-methyl (95%) and 3-methyl ε-caprolactone (5%). However, the oxidation of 4-alkyl cyclohexanone results in only the 5-alkyl ε-caprolactone. Other examples of alkyl substituted ε-caprolactone are 6-methyl; 4-methyl; 5-methyl; 5-tert butyl; 4,6,6-trimethyl and 4,4,6-trimethyl derivatives. 7-methyl ε-caprolactone is preferred.

Copolymerisation of the lactone and glycolic acid precursors of the POAC chain results in a copolymer having a terminal hydroxy and terminal carboxylic acid group. The groups R and Z may, therefore, be attached to the copolymer either via oxygen or the group —COO—. When Z is a basic group or a moiety containing a basic group such as a polyamine or polyimine the group R is preferably hydrogen or a polymerisation terminating group attached via the oxygen atom of the POAC chain. When Z is an acidic group or a moiety containing an acidic group such as carboxylate, sulphate, sulphonate, phosphonate or phosphate, the group R is preferably a polymerisation terminating group attached via the —CO— group of the POAC chain.

Preferred dispersants are derivable from either a POAC acid (i.e. a POAC chain having a terminal carboxylic acid group) which is end-capped by a polymerisation terminal group (hereinafter TPOAC acid) or from a POAC alcohol (i.e. a POAC chain having a terminal hydroxy group) which is end-capped by a polymerisation terminal group (hereinafter TPOAC alcohol).

According to a first aspect of the invention, The Dispersant comprises a polyamine or polyimine carrying at least two POAC chains of Formula 2.

(2)

wherein:
V is a POAC chain moiety $-[(O-A-CO)_n(Gly)_m]-$; and
T is hydrogen or a residue of a chain terminator forming a TPOAC acid.

Preferably the polyamine is polyallylamine or polyvinylamine. However, in a preferred first aspect of the invention, The Dispersant comprises a polyimine and especially a poly($C_{2-4}$-alkyleneimine) (hereinafter "PAI").

For clarity, the oxygen and carbonyl groups in the POAC chain of Formula 2 have been included to indicate the manner of attachment of the group T and do not represent additional oxygen or carbonyl groups over and above those present in the oxyalkylene carbonyl group

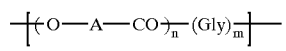

Each POAC chain is preferably linked to the polyamine or polyimine through either a covalent amide link —CO—N< formed between a terminal carbonyl group of the POAC chain and the nitrogen atom of a primary or secondary amino group in the polyamine or polyimine, or through an ionic salt link —COO⁻HN⁺≡ formed between a terminal carboxylate group of the POAC chain and a positively charged nitrogen atom of a substituted ammonium group in the polyamine or polyimine. Because the Dispersant contains at least two POAC chains it may contain a mixture of amide and salt links depending on the severity of the reaction conditions used in its preparation.

The Dispersant of the first aspect of the invention may be conveniently represented by the general Formula 3.

(3)

wherein:
X-*-*-X represents polyamine or polyimine;
Y represents a POAC chain linked to the polyamine or polyimine via an amide or salt linkage;
q is from 2 to 2000; and
POAC is as defined hereinbefore.

Preferably q is not less than 4 and especially not less than 10. It is also preferred that q is not greater than 1000 and preferably not greater than 500.

It is also preferred that the weight ratio of the POAC chain represented by Y to the polyamine or polyimine represented by X-*-*-X is between 30:1 and 1:1, more preferably between 25:1 and 4:1 and especially between 20:1 and 5:1.

The polyamine is preferably PAI and is especially a poly(ethyleneimine) which may be linear or branched (hereinafter PEI).

The PAI preferably has a weight-average molecular weight from 500 to 600,000, more preferably from 1,000 to 200,000, even more preferably from 1,000 to 100,000 and especially from 5,000 to 100,000.

The Dispersant of the first aspect of the invention is obtainable by reacting a polyamine or polyimine with a TPOAC acid of Formula 4 or by reacting a polyamine or polyimine with a lactone and glycolic acid in the presence of a polymerisation terminating compound.

(4)

wherein:
T, V, n and m are as defined hereinbefore.

The length of the POAC chain may be controlled by the presence of a chain stopper or terminating compound, such as a carboxylic acid, in the preparative process. Where the Dispersant contains POAC chains formed by the polymerisation of a lactone and glycolic acid in the presence of polyamine or polyimine there is less need for a chain stopper because the POAC chains grow on the polyamine or polyimine and cannot react together. In such cases the pendant POAC chains are terminated by hydroxy groups i.e. T is H in the TPOAC acid of Formula 4.

The Dispersant may be derived from polyamine or polyimine having at least two primary, secondary or tertiary amino groups and a TPOAC acid or precursors thereof, in which case the reaction product of the amino groups in the polyamine or polyimine and the terminal carboxy group of the POAC acid forms an amide or salt link. The reference to precursors means the lactone(s) and glycolic acid and this terminology will be retained hereinafter. If the polyamine or polyimine contains tertiary amino groups, only salt links can be formed, otherwise salt and/or amide links are formed depending on the reaction conditions. Generally, mild reaction conditions such as low temperatures and/or short reaction times promote the formation of salt links and more severe reaction conditions such as high temperature and/or long reaction times promote the formation of amide links in a manner which is familiar to skilled chemists.

A preferred dispersant of the first aspect of the invention contains a terminating group T which is derived from a carboxylic acid which is preferably free from amino groups. Preferred carboxylic acids are $C_{1-25}$-aliphatic carboxylic acids which may be saturated or un-saturated and which may be substituted by hydroxy, $C_{1-4}$-alkoxy or halogen. Preferred aliphatic acids contain 10 or more carbon atoms. When the aliphatic carboxylic acid is substituted the substituent is preferably hydroxy. Examples of carboxylic acids are methoxyacetic, lactic, caproic, lauric, stearic, ricinoleic, 12-hydroxy stearic, 12-hydroxydodecanoic, 5-hydroxydodecanoic, 5-hydroxydecanoic and 4-hydroxy decanoic acids.

When the Dispersant of the first aspect of the invention contains free amino groups these may be converted into substituted ammonium groups by reaction with an acid or a quaternising agent so that the Dispersant is in the form of a substituted ammonium salt. Suitable reagents for this purpose are mineral and strong organic acids or acidic salts such as acetic acid, sulphuric acid, hydrochloric acid, alkyl sulphonic acids, alkyl hydrogen sulphates and aryl sulphonic acids including acid forms of dyestuffs and pigments and quaternising agents such as dialkylsulphates, for example dimethysulphate (DMS) and alkyl halides such as methyl and ethyl chloride.

The Dispersants of the first aspect of the invention are obtainable by reacting polyamine or polyimine with a POAC acid or precursors thereof at a temperature between 50 and 250° C., preferably in an inert atmosphere and optionally in the presence of an esterification catalyst. Preferably, the temperature is not less than 80° C. and especially not less than 100° C. In order to minimise charring of the Dispersant the temperature is preferably not greater than 150° C.

The inert atmosphere may be any gas which does not react with the final product or starting materials and includes the inert gases of the Periodic Table and especially nitrogen.

When the Dispersant is prepared in a single stage by reacting a polyamine or polyimine, polymerisation terminating agent and precursors, it is preferable to include an esterification catalyst such as tetra-alkyl titanate, for example tetrabutyl titanate, zinc salt of an organic acid, for example, zinc acetate, zirconium salt of an aliphatic alcohol, for example zirconium isopropoxide, toluene sulphonic acid or a strong organic acid such as haloacetic acid, for example trifluoroacetic acid. Zirconium isopropoxide and methane sulphonic acid are preferred. When the Dispersant of the first aspect of the invention is prepared by a single stage process, higher temperature may be required and these are typically from 150–180° C.

It is preferred, however, to prepare the TPOAC acid separately, prior to reacting it with a polyamine or polyimine. In this case, the precursors and polymerisation terminating agent are reacted together in an inert atmosphere at 150–180° C. in the presence of an esterification catalyst. The subsequent reaction of the TPOAC acid with a polyamine or polyimine may then be carried out at temperatures of 100–150° C.

Where the PAI is PEI, the weight ratio of TPOAC acid to PEI can be varied between wide limits depending whether the Dispersant is ultimately to be used to disperse a particulate solid in a polar or non-polar organic medium. Useful results have been obtained using dispersants where the weight ratio of TPOAC acid to PEI is from 30:1 to 1:1, preferably from 25:1 to 4:1 and especially from 20:1 to 5:1.

According to a second aspect of the invention there is provided a Dispersant of Formula 1 wherein Z is an acidic group or moiety which contains an acidic group selected from carboxylate, sulphate, sulphonate, phosphate and phosphonate.

A preferred Dispersant of the second aspect of the invention is a compound of Formula 5.

(5)

wherein:

A and D are groups, one of which is or carries the acidic group and the other is a polymerisation terminating group which does not render the TPOAC chain hydrophilic; and V, n and m are as defined hereinbefore.

In the Dispersant of Formula 5, when D carries the acidic group, A is preferably the group $A^1$-CO— of an esterifiable carboxylic acid of formula $A^1$-COOH, in which $A^1$ is hydrogen or optionally substituted $C_{1-50}$-hydrocarbyl. Preferably $A^1$ is optionally substituted alkyl, alkenyl, cycloalkyl or polycycloalkyl. It is preferred that $A^1$ contains up to 35 and especially up to 25 carbon atoms. In this case, D is preferably a polyvalent, more preferably a di- or tri-valent, bridging group linking the acid group to the POAC chain and is preferably of the formula —K-G-J- wherein K is O, S, NR or a direct link and J is O, NR or a direct link in which R is H, alkyl, alkenyl, cycloalkyl or phenyl or where K and J are both NR, the two groups R may form a single alkylene or alkenylene group linking the two nitrogen atoms to which they are attached, and G is alkylene, alkenylene, cycloalkylene or arylene. The alkyl or alkenyl group in —K-G-J- preferably contains up to 20 carbon atoms and the cycloalkyl group preferably contains from 4 to 8 carbon atoms.

In the compound of Formula 5, when A carries the acidic group, D is preferably the residue of an alcohol, thiol or primary or secondary amine, $D^1$-K—H in which $D^1$ is an aliphatic or alicyclic group of similar character to $A^1$ which is as defined hereinbefore. In this case, A is preferably the acidic group itself and the POAC chain carries a terminal hydroxy group. This hydroxy group may be esterified to give a sulphate or phosphate group by reacting with a suitable sulphating or phosphating agent when the Dispersant may contain one or more sulphate or phosphate ester groups, including mixtures.

Phosphate groups are preferred, and the preferred phosphating agent is $P_2O_5$, $POCl_3$, polyphosphoric acid or phosphorous acid.

Optional substituents in $D^1$ and $A^1$ include halogen, hydroxy, amino, alkoxy and other non-ionic species providing they do not make the POAC chain hydrophilic in character.

Preferably, the group represented by A or D which is remote from the acidic group contains at least 6 and more preferably at least 10 carbon atoms.

The acidic group in the second aspect of the invention may be in the free acid form or it may be present as a salt with a base such as ammonia, an amine, an aminoalcohol or an inorganic metal such as an alkali metal or alkaline earth metal.

One preferred Dispersant of the second aspect of the invention is of general Formula 6.

(6)

wherein:

$A^2$ is hydrogen or a monovalent hydrocarbon or substituted hydrocarbon group; and V, n and m are as defined hereinbefore.

$A^2$ is preferably alkyl which may be linear or branched, saturated or unsaturated. It is also preferred that $A^2$ contains at least 6 and preferably at least 10 carbon atoms. Preferably, $A^2$ contains not greater than 35 and especially not greater than 25 carbon atoms.

When $A^2$ is substituted, the substituents are as defined for $D^1$ and $A^1$.

A second preferred Dispersant of the second aspect of the invention is of general Formula 7.

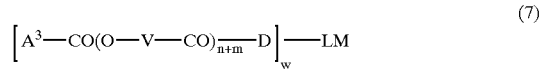

(7)

wherein:

$A^3$-CO is the residue of an esterifiable acid, $A^3$-COOH;

L is phosphonate, sulphonate or methylene carboxylate;

M is a cation;

w is 1 or 2; and

V, D, n and m are as defined hereinbefore.

$A^3$ is an optionally substituted aliphatic or alicyclic group. The aliphatic group may be linear or branched, saturated or unsaturated. Preferably, $A^3$ contains not greater than 35 and more preferably not greater than 25 carbon atoms. Optional substituents in $A^3$ are halogen, tertiary amino and $C_{1-6}$-alkoxy.

Preferably, $A^3$ is unsubstituted.

An especially preferred Dispersant of the second aspect of the invention is of general Formula 8.

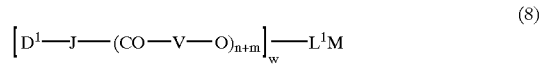

(8)

wherein:

$L^1$ is sulphate or phosphate; and $D^1$, J, V, M, n, m and w are as defined hereinbefore.

$D^1$ may be linear or branched, saturated or unsaturated and preferably contains not greater than 35 and especially not greater than 25 carbon atoms.

Preferably J is oxygen.

Optional substituents in $D^1$ are halogen, tertiary amino and $C_{1-6}$-alkoxy.

Preferably $D^1$ is unsubstituted.

Examples of the bridging group represented by D are —NHC$_2$H$_4$—, —OC$_2$H$_4$—, —OC$_2$H$_4$O—, —OC$_2$H$_4$NH—, —NH(CH$_2$)$_z$NH where z is from 2 to 5, piperazin-1,4-ylene and diaminophen-1,4-ylene.

Examples of the groups represented by $A^1$, $A^2$ and $A^3$ are methyl, ethyl, CH$_3$(CH$_2$)$_4$—, CH$_3$(CH$_2$)$_{10}$—, CH$_3$(CH$_2$)$_{14}$—, CH$_3$(CH$_2$)$_{16}$—, HO(CH$_2$)$_5$—, CH$_3$(CH$_2$)$_7$CH=CH(CH$_2$)$_7$—, CH$_3$(CH$_2$)$_{28}$—, CH$_3$(CH$_2$)$_5$CH(OH)CH$_2$CH=CH(CH$_2$)$_7$— and CH$_3$OCH$_2$— and the residue of abietic acid i.e. abietic acid without the COOH group.

Examples of the group represented by $D^1$ are methyl, ethyl, CH$_3$(CH$_2$)$_9$—, CH$_3$(CH$_2$)$_{11}$—, CH$_3$(CH$_2$)$_{15}$—, CH$_3$(CH$_2$)$_{17}$—, CH$_3$(CH$_2$)$_{29}$—, CH$_3$(CH$_2$)$_7$CH=CH(CH$_2$)$_7$—, $CH_3OCH_2$—, $CH_3(CH_2)_4CH=CHCH_2CH=CH(CH_2)_7$— and the residue of abietyl alcohol i.e. abietyl alcohol without the OH group.

The Dispersants of the second aspect of the invention are obtainable by reacting a POAC acid having terminal hydroxy and carboxylic acid groups or a POAC acid which has a polymerisation terminal group and a hydroxy or carboxylic acid group (TPOAC compound) with a compound having a group reactive therewith and carrying a terminal acidic group. Alternatively, the POAC acid or TPOAC compound may be reacted directly with a precursor of the acidic group or with a bifunctional compound which is subsequently reacted with a precursor of the acidic group. In the above processes the POAC acid or TPOAC compound may be prepared in situ from glycolic acid and a lactone(s) and polymerisation terminal compounds and converted directly to the Dispersant of the second aspect of the invention. Suitable compounds containing the acidic group are α-amino- or α-hydroxy alkane carboxylic acids, such as glycine and amino-hydroxy-organic sulphonic or phosphonic acids, such as amino ethane sulphonic acid. Suitable precursors of the acidic group itself are $P_2O_5$ and polyphosphoric acid. Suitable bifunctional compounds which can form a linking group between the POAC acid or TPOAC compound and the acidic group are polyamines, polyols and hydroxyamines.

The Dispersant of Formula 6 is obtainable by the polymerisation of a lactone(s) and glycolic acid to give a POAC chain which is subsequently reacted with a carboxylic acid $A^{2-}COOH$ which is free from hydroxy groups or by polymerising glycolic acid and the lactone(s) in the presence of $A^{2-}COOH$ which acts as polymerisation terminal compound. Examples of acids, $A^2$-COOH, are acetic, propionic, caproic, lauric and stearic acids and include those derived from a naturally occurring oil, such as tall oil fatty acid.

The POAC acid or precursors thereof may be reacted with $A^2$-COOH in a suitable hydrocarbon solvent such as toluene or xylene which can form an azeotrope with the water produced in the esterification reaction. The reaction is preferably carried out in an inert atmosphere such as nitrogen at a temperature between 80° and 250°, preferably from 150 to 180° C. Preferably, the reaction is carried out in the presence of an esterification catalyst as defined hereinbefore.

The Dispersant of the second aspect of the invention is also obtainable by reacting a compound of Formula 6 with an appropriate co-reactant which also contains at least one acidic group and which is capable of reacting with the carboxylic acid group of the compound of Formula 6. Examples of groups capable of reacting with the carboxylic acid group are amines and hydroxy groups. Examples of co-reactants are amino-acids such as glycine and short chain hydroxy acids such as lactic acid.

The Dispersant of the second aspect of the invention is also obtainable by an indirect, two-stage process in which the compound of Formula 6 is reacted with a linking compound containing at least one reactive group which reacts with a carboxylic acid group such as hydroxy or amino and at least one other reactive group and the intermediate product so obtained is then reacted with a compound containing the acidic group and a group capable of reacting with said other reactive group of the linking compound. Suitable linking compounds include polyols, diamines and hydroxy amines such as ethylene glycol, propylene glycol, glycerol, trimethylol propane, pentaerythritol, sorbitol, ethylenediamine, trimethylenediamine, hexamethylenediamine, diethylenetriamine, ethanolamine, diethanolamine, dipropanolamine and tris(hydroxymethyl)aminomethane. Hydroxyamine linking compounds are preferred because of the different reactivities of the hydroxy and amino groups which reduces the formation of oligomeric intermediate products. Suitable linking compounds containing an acidic group and said other reactive group with which the compound of Formula 6 reacts include strong inorganic acids such as phosphoric acid, sulphuric acid, chlorosulphonic acid and sulphamic acid and organic salts such as alkyl- and aryl-phosphonic acids, alkyl- and aryl-sulphonic acids and monochloroacetic acid.

In preparing the Dispersant of the second aspect of the invention from the compound of Formula 6, the reaction of the latter with the compound containing the acidic group (in the direct route) or with the linking compound (in the indirect route) is carried out under conditions which are appropriate to the reactants involved. Thus, in the case where the compound of Formula 6 is reacted directly with a functional acid such as glycine the reactants may be heated together at a temperature from 180 to 250° C., if desired in the presence of a solvent such as xylene and also optionally in the presence of an esterification catalyst as hereinbefore defined until the acid value of the reaction mix has fallen to the appropriate level. The reactants are preferably used in approximately stoichiometric amounts with respect to the carboxy group in the compound of Formula 6 and the hydroxy or amino group in the compound bearing the acidic group. Similar conditions apply, in the case of the indirect route, to the reaction between the compound of Formula 6 and the linking compound, except that only one reactive group in the latter is utilised to ensure that the resulting intermediate product still contains said other reactive group available for subsequent reaction with the compound bearing the acidic group. When the linking compound is a hydroxyamine, the reaction temperature is preferably from 150 to 200° C. Here again, an inert solvent or diluent and/or catalyst may be present, if desired.

In the second stage of the indirect route, the intermediate product is reacted with the compound bearing the acidic group at a temperature and for a period of time sufficient for completion of the reaction as indicated by the attainment of a substantially constant acid value of the reaction mixture. When the compound containing the acidic group is a polybasic acid such as phosphoric acid or sulphuric acid, it is preferred that one or two, especially one, of the ionisable hydrogen atoms therein is reacted and that no attempt is made to remove the water formed in the reaction. Normally, the reaction is complete in about 3 hours at 40 to 70° C.; more stringent conditions are preferably avoided because of the risk of dehydration of the product, especially when sulphuric acid is used. These complications do not arise in the case of monochloroacetic acid, but the reaction proceeds more slowly and rather more forcing conditions are required. In general, the compound containing the acidic group is used in approximately stoichiometric amounts with respect to the available reactive group in the precursor but a lower or higher amount may be used, if desired.

The Dispersant of Formula 7, in which J is a direct link, is obtainable by reacting a POAC acid having a terminal carboxylic acid group with an amino- or hydroxy-organic sulphonate and preferably an amino- or hydroxy alkyl phosphate. The Dispersant of Formula 7 wherein J is NR or oxygen is obtainable by reacting a POAC acid with a diol or hydroxamino compound, such as an amino alcohol, and subsequently reacting the terminal hydroxy group of the intermediate formed with a phosphating agent such as $P_2O_5$ or polyphosphoric acid, or with a sulphonating agent, such as chlorosulphonic acid.

The Dispersant of Formula 7, wherein K is a direct link, is obtainable by reacting a TPOAC acid of Formula 9

$$A^3CO(O-V-CO)_{n+m}-OH \tag{9}$$

with a compound of Formula 10

$$(H-K-G)_w LM \tag{10}$$

wherein $A^3$, V, K, G, L, M, n, m and w are as defined hereinbefore.

The Dispersant of Formula 7 wherein K is O or NR is obtainable by reacting a TPOAC acid of Formula 9 with a compound of Formula 11

$$H-K-G-O-H \tag{11}$$

and subsequently reacting with a sulphating or phosphating agent.

The especially preferred Dispersant of Formula 8 is obtainable by polymerising glycolic acid and a lactone(s) in the presence of a monohydric alcohol or a primary or secondary mono-amine to form a TPOAC alcohol having a terminal hydroxy group i.e. a POAC chain having a terminal hydroxy group and a polymerisation terminal group. Monohydric alcohols are preferred, especially those having up to 35 and more especially those having up to 25 carbon atoms. Lauryl alcohol is particularly preferred. The TPOAC alcohol is subsequently reacted with a phosphating or sulphating agent. Phosphating agents are preferred, especially $P_2O_5$ and polyphosphoric acid.

The TPOAC alcohol is obtainable by reacting glycolic acid and a lactone(s) with a monohydric alcohol under similar conditions to those used to prepare a TPOAC acid.

The Dispersant which is a phosphate ester of Formula 8 is obtainable by reacting a TPOAC alcohol with a phosphating agent wherein the ratio of the alcohol to each phosphorus atom of the phosphating agent is from 3:1 to 1:1 and especially from 2:1 to 1:1. It is especially preferred that the ratio of each TPOAC alcohol to each phosphorus atom of the phosphating agent is less than 2, for example, about 1.5:1 when the dispersant is a mixture of mono- and di-phosphate esters.

The reaction between the TPOAC alcohol and phosphating agent is preferably carried out in an inert atmosphere such as nitrogen under anhydrous conditions. The reaction may be carried out in an inert solvent but is more convenient to react the TPOAC alcohol with the phosphating agent in the absence of a solvent. The reaction temperature is preferably above 60 and especially above 80° C. In order to avoid charring the dispersant, the temperature is preferably less than 120 and especially less than 100° C.

As a less preferred variant, the Dispersant of Formula 8 may also be prepared by reacting a monohydric alcohol with a preformed POAC acid and subsequently reacting the TPOAC alcohol with a phosphating or sulphating reagent.

The Dispersants of the second aspect of the invention may contain additional ester, amide or amine salt groups formed by reacting the dispersant bearing an acidic group with an alcohol or alkanolamine.

The Dispersants of the second aspect of the invention may be in the form of a free acid or it may form a salt with an alkali metal, ammonia, an amine, alkanolamine or quaternary ammonium salt. The Dispersant of the second aspect of the invention is preferably in the form of a salt with an amine. Examples of suitable amines are n-butylamine, diethanolamine and dimethylaminopropylamine.

The Dispersant of the first aspect of the invention may also be in the form of a salt with a coloured acid. By the term "coloured acid" is meant an organic pigment or dyestuff containing at least one, preferably from 1 to 6 acid groups, especially sulphonic, phosphonic or carboxylic acid groups. A preferred coloured acid is copper phthalocyanine or other deeply coloured pigment and especially sulphonated copper phthalocyanine containing, on average, from 0.5 to 3 sulphonic acid groups per molecule.

Many of the intermediates used in the preparation of the Dispersants according to the invention are novel, especially the TPOAC acid used to make dispersants of the first aspect of the invention and the TPOAC alcohol used to make the preferred dispersants of the second aspect of the invention.

Thus, according to the invention there is provided a TPOAC acid of Formula 12

$$R-(O-V-CO)_{n+m}-OH \tag{12}$$

and a TPOAC alcohol of Formula 13

$$D^1-J-(CO-V-O)_{n+m}H \tag{13}$$

wherein

R, V, $D^1$, J, n and m are as defined hereinbefore.

As noted hereinbefore, the dispersants are particularly useful for dispersing a particulate solid in an organic medium.

According to a further aspect of the invention there is provided a composition comprising a particulate solid and a dispersant of Formula 1.

According to a still further aspect of the invention there is provided a dispersion comprising a dispersant of Formula 1, a particulate solid and an organic medium.

The solid present in the Dispersion may be any inorganic or organic solid material which is substantially insoluble in the organic medium at the temperature concerned and which it is desired to stabilise in a finely divided form therein.

Examples of suitable solids are pigments for solvent inks; pigments, extenders and fillers for paints and plastics materials; dyes, especially disperse dyes; optical brightening agents and textile auxiliaries for solvent dyebaths, inks and other solvent application systems; solids for oil-based and invert-emulsion drilling muds; dirt and solid particles in dry cleaning fluids; particulate ceramic materials; magnetic materials and magnetic recording media, and biocides, agrochemicals and pharmaceuticals which are applied as dispersions in organic media.

A preferred solid is a pigment from any of the recognised classes of pigments described, for example, in the Third Edition of the Colour Index (1971) and subsequent revisions of, and supplements thereto, under the chapter headed "Pigments". Examples of inorganic pigments are titanium dioxide, zinc oxide, Prussian blue, cadmium sulphide, iron oxides, vermilion, ultramarine and the chrome pigments, including chromates, molybdates and mixed chromates and sulphates of lead, zinc, barium, calcium and mixtures and modifications thereof which are commercially available as greenish-yellow to red pigments under the names primrose, lemon, middle, orange, scarlet and red chromes. Examples of organic pigments are those from the azo, disazo, condensed azo, thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes. Carbon black, although strictly inorganic, behaves more like an organic pigment in its dispersing properties. Preferred organic pigments are phthalocyanines, especially copper phthalocyanines, monoazos, disazos, indanthrones, anthranthrones, quinacridones and carbon blacks.

Other preferred solids are: extenders and fillers such as talc, kaolin, silica, barytes and chalk; particulate ceramic materials such as alumina, silica, zirconia, titania, silicon nitride, boron nitride, silicon carbide, boron carbide, mixed silicon-aluminium nitrides and metal titanates; particulate magnetic materials such as the magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and agrochemicals such as the fungicides flutriafen, carbendazim, chlorothalonil and mancozeb.

The organic medium present in the dispersions of the invention is preferably a polar organic medium or a substantially non-polar aromatic hydrocarbon or halogenated hydrocarbon. By the term "polar" in relation to the organic medium is meant an organic liquid or resin capable of forming moderate to strong bonds as described in the article entitled "A Three Dimensional Approach to Solubility" by Crowley et al in Journal of Paint Technology, Vol. 38, 1966, at page 269. Such organic media generally have a hydrogen bonding number of 5 or more as defined in the abovementioned article.

Examples of suitable polar organic liquids are amines, ethers, especially lower alkyl ethers, organic acids, esters, ketones, glycols, alcohols and amides. Numerous specific examples of such moderately strongly hydrogen bonding liquids are given in the book entitled "Compatibility and Solubility" by Ibert Mellan (published in 1968 by Noyes Development Corporation) in Table 2.14 on pages 39–40 and these liquids all fall within the scope of the term polar organic liquid as used herein.

Preferred polar organic liquids are dialkyl ketones, alkyl esters of alkane carboxylic acids and alkanols, especially such liquids containing up to, and including, a total of 6 carbon atoms. As examples of the preferred and especially preferred liquids there may be mentioned dialkyl and cycloalkyl ketones, such as acetone, methyl ethyl ketone, diethyl ketone, di-isopropyl ketone, methyl isobutyl ketone, di-isobutyl ketone, methyl isoamyl ketone, methyl n-amyl ketone and cyclohexanone; alkyl esters such as methyl acetate, ethyl acetate, isopropyl acetate, butyl acetate, ethyl formate, methyl propionate, methoxy propylacetate and ethyl butyrate; glycols and glycol esters and ethers, such as ethylene glycol, 2-ethoxyethanol, 3-methoxypropylpropanol, 3-ethoxypropylpropanol, 2-butoxyethyl acetate, 3-methoxypropyl acetate, 3-ethoxypropyl acetate and 2-ethoxyethyl acetate; alkanols such as methanol, ethanol, n-propanol, isopropanol, n-butanol and isobutanol and dialkyl and cyclic ethers such as diethyl ether and tetrahydrofuran.

The substantially non-polar, organic liquids which may be used, either alone or in admixture with the aforementioned polar solvents, are aromatic hydrocarbons, such as toluene and xylene, aliphatic hydrocarbons such as hexane, octane and decane, and halogenated aliphatic and aromatic hydrocarbons, such as trichloro-ethylene, perchloroethylene and chlorobenzene. Examples of other hydrocarbons are those which are commercially available as high boiling aromatic and aliphatic distillates such as white spirits.

Examples of suitable polar resins, as the medium for the dispersion form of the present invention, are film-forming resins such as are suitable for the preparation of inks, paints and chips for use in various applications such as paints and inks. Examples of such resins include polyamides, such as Versamid™ and Wolfamid™, and cellulose ethers, such as ethyl cellulose and ethyl hydroxyethyl cellulose. Examples of paint resins include short oil alkyd/melamine-formaldehyde, polyester/melamine-formaldehyde, thermosetting acrylic/melamine-formaldehyde, long oil alkyd and multi-media resins such as acrylic and urea/aldehyde. Examples of other resins are polyester, acrylic, epoxy, urethane, silicone, fluorine, benzoguanamine, urea, phenolic, vinyl chloride and polyethylene resins.

If desired, the dispersions may contain other ingredients, for example resins (where these do not already constitute the organic medium) binders, fluidising agents (such as those described in GB-A-1508576 and GB-A-2108143), anti-sedimentation agents, plasticisers, levelling agents and preservatives.

The dispersions typically contain from 5 to 95% by weight of the solid, the precise quantity depending on the nature of the solid and the quantity depending on the nature of the solid and the relative densities of the solid and the organic medium. For example, a dispersion in which the solid is an organic material, such as an organic pigment, preferably contains from 15 to 60% by weight of the solid whereas a dispersion in which the solid is an inorganic material, such as an inorganic pigment, filler or extender, preferably contains from 40 to 90% by weight of the solid based on the total weight -of dispersion.

The dispersion may be obtained by any of the conventional methods known for preparing dispersions. Thus, the solid, the organic medium and the dispersant may be mixed in any order, the mixture then being subjected to a mechanical treatment to reduce the particles of the solid to an appropriate size, for example by ball milling, bead milling, gravel milling or plastic milling until the dispersion is formed. Alternatively, the solid may be treated to reduce its particle size independently or in admixture with either the organic medium or the dispersant, the other ingredient or ingredients then being added and the mixture being agitated to provide the dispersion.

If the composition is required in dry form, the liquid medium is preferably volatile so that it may be readily removed from the particulate solid by a simple separation means such as evaporation. It is preferred, however, that the dispersion comprises the liquid medium.

If the dry composition consists essentially of the Dispersant and the particulate solid, it preferably contains at least 0.2%, more preferably at least 0.5% and especially at least 1.0% dispersant based on weight of the particulate solid. Preferably the dry composition contains not greater than 100%, preferably not greater than 50%, more preferably not greater than 20% and especially not greater than 10% by weight based on the weight of the particulate solid.

As described hereinbefore, the Dispersants of the invention are particularly suitable for preparing mill-bases where the particulate solid is milled in a liquid medium in the presence of both a particulate solid and a film-forming resin binder.

Thus, according to a still further aspect of the invention there is provided a mill-base comprising a particulate solid, dispersant and a film-forming resin.

Typically, the mill-base contains from 20 to 70% by weight particulate solid based on the total weight of the mill-base. Preferably, the particulate solid is not less than 30 and especially not less than 50% by weight of the mill-base.

The amount of resin in the mill-base can vary over wide limits but is preferably not less than 10%, and especially not less than 20% by weight of the continuous/liquid phase of the mill-base. Preferably, the amount of resin is not greater than 50% and especially not greater than 40% by weight of the continuous/liquid phase of the mill-base.

The amount of dispersant in the mill-base is dependent on the amount of particulate solid but is preferably from 0.5 to 20% and more preferably 0.5 to 5% by weight of the mill-base.

Dispersions and mill bases containing the dispersants of the invention are particularly suitable for use in paints, especially high solids paints, inks, especially flexographic, gravure and screen inks, and non-aqueous ceramic processes, especially tape-coating, doctor-blade, extrusion and injection moulding type processes.

The Dispersants of the present invention exhibit advantage over known dispersants derived from ε-caprolactone. In particular, they exhibit superior solubility in organic media such as solvents and do not separate or crystallise when stored at 4° C. for lengthy periods. When stored at low temperatures, separation can occur at −24° C. but the dispersants readily re-dissolve on warming to 4–10° C. When incorporated into paints and painting inks, the dispersants of the present invention give rise to higher gloss readings and lower haze values in the resultant paints and inks.

The invention is further illustrated by the following examples wherein all references to amounts are in parts by weight unless indicated to the contrary.

EXAMPLES

Preparation of Alkyl ε-Caprolactone Intermediates
Lactone 1 4- and 6-Methyl ε-Caprolactone 3-methylcyclohexanone (10 parts, 0.089M ex. Aldrich) was dissolved in dichloromethane (400 ml) and sodium bicarbonate (37 parts) added, portionwise, with vigorous stirring at 18–20° C. under a nitrogen atmosphere. A suspension of 3-chloroperoxybenzoic acid (24.17 parts, 0.098M ex. Fluka) in dichloromethane (100 ml) was then added over 10 minutes with external cooling to maintain a temperature below 20° C. and the reaction continued at 18–20° C. by stirring for a further 4 hours. The reaction mix was then shaken with a 10% aqueous solution of sodium sulphite (2×250 ml) followed by water (2×250 ml) and then dried over anhydrous magnesium sulphate. After evaporating the solvent a mixture of 4- and 6-methyl ε-caprolactone was obtained as a thin yellow oil (8 parts).

Lactone 2 3- and 7-Methyl ε-Caprolactone

This was prepared in the same manner as that described for Lactone 1 except using the same weight of 2-methylcyclohexanone (ex. Aldrich) in place of 3-methylcyclohexanone. The product was obtained as a clear oil (8 parts) and is mainly 7-methyl ε-caprolactone (95%).

Lactone 3 5-Methyl ε-Caprolactone

This was prepared in similar manner to Lactone 1 except using 4-methyl cyclohexanone (50 parts; 0.445m ex. Aldrich) in place of the 3-methylcyclohexanone with appropriate increase in the dichloromethane (1500 ml), sodium bicarbonate (8.1 parts, 1.0M) and 3-chloroperoxybenzoic acid (123 parts; 0.5M). The reaction temperature was maintained below 10° C. throughout. The 5-methyl ε-caprolactone was obtained as a clear yellow oil (49 parts).

Lactone 4 5-Tertbutyl ε-Caprolactone

This was prepared in the same manner as Lactone 1 except using 4-tert butylcyclohexanone (10 parts, 0.065m ex. Aldrich), 3-chloroperoxybenzoic acid (17.5 parts, 0.0713M), sodium bicarbonate (11.5 parts, 0.143M) and dichloromethane (750 ml) in place of the 3-methyl cyclohexanone and amounts described for Lactone 1. The product was obtained as an oil (10.2 parts).

Lactone 5 4,6,6- and 4,4,6-Trimethyl ε-Caprolactone 3,3,5-Trimethylcyclohexanone (10 parts, 0.071M ex. Fluka) was dissolved in dichloromethane (200 ml). 3-chloroperoxybenzoic acid (30.6 parts, 0.142M) was added, portionwise, with stirring and the reaction mix cooled externally below 5° C. Trifluoroacetic acid (8 parts, 0.071M ex. Fluka) was added dropwise over 30 minutes with stirring at 0–5° C. and the reactants stirred for a further 20 hours allowing the temperature to rise to 18–20° C.

The reaction mass was then poured into a 10% w/w aqueous solution of sodium sulphite (50 ml) and allowed to stand. The solvent layer was separated and shaken with 10% aqueous sodium sulphite (2×50 ml), 10% w/w aqueous potassium carbonate (3×50 ml) and water (2×50 ml). Finally, the solvent phase was dried over anhydrous sodium sulphate and the solvent evaporated. The product was obtained as a clear colourless oil (11 parts).

Preparation of Intermediates

In the title of the intermediates the components of the POAC chain and chain-stopper or polymerisation terminating group is indicated. The figures following the component identifier indicate the molar ratio of the components.

Example 1

LA1, ε-Cap (10), Gly (3)

Lauric acid (LA, 30 parts, 150 mM ex. Aldrich), glycolic acid (Gly, 34.2 parts, 450 mM ex. Aldrich) and ε-caprolactone (ε-cap, 171 parts, 1500 mM ex. Aldrich) were stirred under nitrogen at 120° C. Tetra-n-butyl titanate (0.3 parts, ex. Aldrich) was added, the temperature raised to 175° C. and the reactants stirred at this temperature for 18 hours. The product was obtained as a brown liquid which solidified on cooling (222 parts). The number average MW was 1648 with an acid value of 45 mgKOH/gm. This is Intermediate 1.

Examples 2 to 7

The intermediate TPOAC acids in Table 1 below were prepared in analogous manner to that described in Example 1 above using the chain-stopping acid indicated and the molar ratio of acid, ε-caprolactone and glycolic acid as shown in the table.

TABLE 1

| Example/Intermediate | Chain-stopper acid | ε-cap | δ-val | Gly | Mn | Mw | Pd |
|---|---|---|---|---|---|---|---|
| 2 | LA, 1 | 8 | — | 6 | 1003 | 1536 | 1.53 |
| 3 | LA, 1 | 6 | — | 8 | 921 | 1535 | 1.67 |
| 4 | LA, 1 | 5 | — | 10 | 1149 | 1723 | 1.50 |
| 5 | MA, 1 | 6 | — | 10 | 1057 | 1656 | 1.57 |
| 6 | MA, 1 | — | 8 | 8 | 934 | 1489 | 1.60 |
| 7 | LA, 1 | 10 | — | 3 | 1146 | 2255 | 1.97 |

Footnote to Table 1
LA is Lauric Acid
MA is methoxyacetic acid
ε-cap is ε-caprolactone
δ-val is δ-valerolactone
Mn is the number average MW
Mw is the weight average MW
Pd is the MW distribution Mw divided by Mn

Example 8

LA 1, ε-Cap 6, Gly 8

Example 1 was repeated except using 6 parts ε-caprolactone and 8 parts glycolic acid in place of the amounts used in Example 1 and also replacing the tetra n-butyltitanate with the same amount of zirconium isopropoxide as catalyst. This gave Intermediate 8, Mn 459, Mw 1085, Pd 2.36.

Example 9

LA 1, ε-Cap 6, Gly 8

Example 8 was repeated except replacing the zirconium isopropoxide with the same amount of methanesulphonic acid as catalyst. This gave Intermediate 9, Mn 765, Mw 1398, Pd 1.83.

Examples 10 to 23

Example 9 was repeated except using the chain stopper acid and amounts of ε-caprolactone and glycolic acid indicated in Table 2 below.

TABLE 2

| Example/ Intermediate | Chain-stopper acid | ε-cap | Gly | Mn | Mw | Pd |
|---|---|---|---|---|---|---|
| 10 | LA 1 | 8 | 6 | 648 | 1432 | 2.2 |
| 11 | LA 1 | 10 | 3 | 938 | 1676 | 1.79 |
| 12 | LA 1 | 10 | 6 | 522 | 1407 | 2.70 |
| 13 | LA 1 | 12 | 3 | 1261 | 2210 | 1.75 |
| 14 | LA 1 | 12 | 6 | 1317 | 2308 | 1.75 |
| 15 | LA 1 | 12 | 10 | 800 | 1362 | 1.70 |
| 16 | LA 1 | 12 | 2 | 1400 | 2795 | 2.00 |
| 17 | LA 1 | 14 | 2 | 1601 | 3288 | 2.05 |
| 18 | MA 1 | 12 | 2 | 1446 | 2977 | 2.07 |
| 19 | HA 1 | 11 | 2 | 1344 | 2652 | 1.97 |
| 20 | SA 1 | 10 | 2 | 1516 | 2894 | 1.91 |
| 21* | LA 1 | 10 | 3 | 1431 | 2642 | 1.82 |
| 22* | LA 1 | 10 | 3 | 1117 | 2296 | 2.06 |
| 23** | LA 1 | 10 | 3 | 1330 | 2581 | 1.94 |

Footnote to Table 2
LA is lauric acid
MA is methoxyacetic acid
HA is hexanoic acid
SA is stearic acid
*is methanesulphonic acid used as catalyst for 6–8 hours and then an equal amount of tetra-n-butyltitanate and the reaction continued for a further 10 hours.
**as intermediates 21 and 22 except using zirconium isopropoxide as the second addition of catalyst.

Example 24

(LA 1, ε-Cap 10, Gly 3) PEI (13:1)

Intermediate 1 (Example 1, 52 parts) was heated to 120° C. under a nitrogen blanket and polyethylene imine SP 200 (4 parts, ex. Nippon Shokubai) was added with stirring. The reactants were stirred at 120° C. under nitrogen for a further 6 hours. On cooling, the product was obtained as a pale brown, soft solid (50 parts). This is Dispersant 1.

Examples 25 to 61

Example 24 was repeated except using the Intermediates indicated in Table 3 below.

TABLE 3

| Example | Dispersant | Intermediate | TPOAC acid End-cap acid | ε-cap | δ-val | Gly | Ratio of TPOAC to PEI |
|---|---|---|---|---|---|---|---|
| 25 | 2 | 2 | LA 1 | 8 | — | 6 | 12:1 |
| 26 | 3 | 2 | LA 1 | 8 | — | 6 | 9:1 |
| 27 | 4 | 3 | LA 1 | 6 | — | 8 | 13:1 |
| 28 | 5 | 3 | LA 1 | 6 | — | 8 | 9:1 |
| 29 | 6 | 4 | LA 1 | 5 | — | 10 | 13:1 |
| 30 | 7 | 4 | LA 1 | 5 | — | 10 | 9:1 |
| 31 | 8 | 5 | MA 1 | 6 | — | 10 | 13:1 |
| 32 | 9 | 5 | MA 1 | 6 | — | 10 | 9:1 |
| 33 | 10 | 6 | MA 1 | — | 8 | 8 | 13.1 |
| 34 | 11 | 6 | MA 1 | — | 8 | 8 | 9:1 |
| 35 | 12 | 1 | LA 1 | 10 | — | 3 | 9:1 |
| 36 | 13 | 8 | LA 1 | 6 | — | 8 | 13:1 |
| 37 | 14 | 9 | LA 1 | 6 | — | 8 | 13:1 |
| 38 | 15 | 9 | LA 1 | 6 | — | 8 | 20:1 |
| 39 | 16 | 9 | LA 1 | 6 | — | 8 | 25:1 |
| 40 | 17 | 10 | LA 1 | 8 | — | 6 | 13:1 |
| 41 | 18 | 10 | LA 1 | 8 | — | 6 | 20:1 |
| 42 | 19 | 11 | LA 1 | 10 | — | 3 | 13:1 |
| 43 | 20 | 12 | LA 1 | 10 | — | 6 | 13:1 |
| 44 | 21 | 12 | LA 1 | 10 | — | 6 | 20:1 |
| 45 | 22 | 11 | LA 1 | 10 | — | 3 | 18:1 |
| 46 | 23 | 11 | LA 1 | 10 | — | 3 | 10:1 |
| 47 | 24 | 13 | LA 1 | 12 | — | 3 | 13:1 |
| 48 | 25 | 14 | LA 1 | 12 | — | 6 | 13:1 |
| 49 | 26 | 15 | LA 1 | 12 | — | 10 | 13:1 |
| 50 | 27 | 16 | LA 1 | 12 | — | 2 | 13:1 |
| 51 | 28 | 17 | LA 1 | 14 | — | 2 | 13:1 |
| 52 | 29 | 17 | LA 1 | 14 | — | 2 | 9:1 |
| 53 | 30 | 18 | MA 1 | 12 | — | 2 | 13:1 |
| 54 | 31 | 18 | MA 1 | 12 | — | 2 | 9:1 |
| 55 | 32 | 19 | HA 1 | 11 | — | 2 | 13:1 |
| 56 | 33 | 19 | HA 1 | 11 | — | 2 | 9:1 |

TABLE 3-continued

| Example | Dispersant | Intermediate | End-cap acid | TPOAC acid ε-cap | TPOAC acid δ-val | TPOAC acid Gly | Ratio of TPOAC to PEI |
|---|---|---|---|---|---|---|---|
| 57 | 34 | 20 | SA 1 | 10 | — | 2 | 13:1 |
| 58 | 35 | 20 | SA 1 | 10 | — | 2 | 9:1 |
| 59* | 36 | 21 | LA 1 | 10 | — | 3 | 13:1 |
| 60* | 37 | 22 | LA 1 | 10 | — | 3 | 13:1 |
| 61** | 38 | 23 | LA 1 | 10 | — | 3 | 13:1 |

Footnote to Table 3
LA, MA, HA, SA, * and ** are as explained in the footnote to Table 2.

Example 62 to 100

The Dispersant (0.45 parts) was dissolved in a 4:1 mixture of methoxypropylacetate/n-butanol (7.55 parts) in an 8 dram glass vial containing 3 mm diameter glass beads (17 parts). Monolite Rubine 3B (2.00 parts ex. Zeneca) was added, the vial closed and shaken on a horizontal shaker for 16 hours. The viscosity of the resulting dispersion was assessed initially and after standing.

The solubility of the dispersant was also assessed by dissolving the Dispersant (2.0 parts) in 4:1 mixture of methoxypropylacetate/n-butanol (10 parts) with heating as required. The presence of crystals was determined after storage at 4° C. for 72 hours.

The results are given in Table 4 below:

TABLE 4

| Example | Dispersant | End-cap acid | TPOAC acid ε-cap | TPOAC acid δ-val | TPOAC acid Gly | PEI ratio | Dispersion viscosity | Solubility at 4° C. |
|---|---|---|---|---|---|---|---|---|
| 62 | 1 | LA 1 | 10 | — | 3 | 13:1 | C | Clear |
| 63 | 2 | LA 1 | 8 | — | 6 | 12:1 | B/C | Clear |
| 64 | 3 | LA 1 | 8 | — | 6 | 9:1 | A | Clear |
| 65 | 4 | LA 1 | 6 | — | 8 | 13:1 | C | Hazy |
| 66 | 5 | LA 1 | 6 | — | 8 | 9:1 | C | Hazy |
| 67 | 6 | LA 1 | 5 | — | 10 | 13:1 | D | Clear |
| 68 | 7 | LA 1 | 5 | — | 10 | 9:1 | D | Clear |
| 69 | 8 | MA 1 | 6 | — | 10 | 13:1 | D | Clear |
| 70 | 9 | MA 1 | 6 | — | 10 | 9:1 | D | Clear |
| 71 | 10 | MA 1 | — | 8 | 8 | 13:1 | C | Clear |
| 72 | 11 | MA 1 | — | 8 | 8 | 9:1 | C | Clear |
| 73 | 12 | LA 1 | 10 | — | 3 | 9:1 | B | Clear |
| 74 | 13 | LA 1 | 6 | — | 8 | 13:1 | D | Clear |
| 75 | 14 | LA 1 | 6 | — | 8 | 13:1 | B/C | Clear |
| 76 | 15 | LA 1 | 6 | — | 8 | 20:1 | B | Clear |
| 77 | 16 | LA 1 | 6 | — | 8 | 25:1 | D | Clear |
| 78 | 17 | LA 1 | 8 | — | 6 | 13:1 | D | Clear |
| 79 | 18 | LA 1 | 8 | — | 6 | 20:1 | B/C | Clear |
| 80 | 19 | LA 1 | 10 | — | 3 | 13:1 | B | Clear |
| 82 | 20 | LA 1 | 10 | — | 6 | 13:1 | D | Clear |
| 83 | 21 | LA 1 | 10 | — | 6 | 20:1 | D | Clear |
| 84 | 22 | LA 1 | 10 | — | 3 | 18:1 | C/D | Clear |
| 85 | 23 | LA 1 | 10 | — | 3 | 10:1 | B | Clear |
| 86 | 24 | LA 1 | 12 | — | 3 | 13:1 | B | Clear |
| 87 | 25 | LA 1 | 12 | — | 6 | 13:1 | B | Clear |
| 88 | 26 | LA 1 | 12 | — | 10 | 13:1 | B/C | Clear |
| 89 | 27 | LA 1 | 12 | — | 2 | 13:1 | B/C | Clear |
| 90 | 28 | LA 1 | 14 | — | 2 | 13:1 | C | Clear |
| 91 | 29 | LA 1 | 14 | — | 2 | 9:1 | C/D | Clear |
| 92 | 30 | MA 1 | 12 | — | 2 | 13:1 | B/C | Clear |
| 93 | 31 | MA 1 | 12 | — | 2 | 9:1 | B | Clear |
| 94 | 32 | HA 1 | 11 | — | 2 | 13:1 | A/B | Clear |
| 95 | 33 | HA 1 | 11 | — | 2 | 9:1 | B/C | Clear |
| 96 | 34 | SA 1 | 10 | — | 2 | 13:1 | B/C | Clear |
| 97 | 35 | SA 1 | 10 | — | 2 | 9:1 | A/B | Clear |
| 98 | 36* | LA 1 | 10 | — | 3 | 13:1 | A/B | Clear |

TABLE 4-continued

| | | TPOAC acid | | | | | | |
|---|---|---|---|---|---|---|---|---|
| Example | Dispersant | End-cap acid | ε-cap | δ-val | Gly | PEI ratio | Dispersion viscosity | Solubility at 4° C. |
| 99 | 37* | LA 1 | 10 | — | 3 | 13:1 | C/D | Clear |
| 100 | 38** | LA 1 | 10 | — | 3 | 13:1 | B | Clear |
| Control 1 | | | | | | | A/B | Crystals |
| Control 2 | | | | | | | D/E | |

Footnote to Table 4
LA, MA, HA, SA, * and ** are as explained in the footnote to Table 2.
A is very fluid
B is fluid, gels after 10 minutes
C is fluid, gels after 1 minute
D is slightly fluid, gels immediately after shaking
E is thick, immovable gel
Control 1 is ε-caprolactone polymerised in the presence of lauric acid and PEI (MW 10,000)
Control 2 contains no dispersant and where the amount of dispersant is replaced by the same amount of the solvent mixture.

Example 101

LA (1), ε-Cap (10), Gly (3)

Lauric acid (10 parts, 0.05m ex. Aldrich), glycolic acid (11.39 parts, 0.15M ex. Aldrich) and ε-caprolactone (56.98 parts, 0.5M ex. Aldrich) were stored under nitrogen at 130° C. Methane sulphonic acid (0.3 parts ex. Adlrich) was added and the temperature raised to 160° C. The reactants were stirred for 2 hours at 160° C. and then for 24 hours at 185–90° C. The product was obtained as a beige liquid which cooled to give a beige wax (73.08 parts). This is Intermediate 24.

Example 102

[LA (1), ε-Cap (10), Gly (3)] Polyallylamine (13:1)

Intermediate 24 (73.08 parts ex. Example 101) was stirred under nitrogen at 100° C. Polyallylamine (6.09 parts ex. Aldrich MW 8,500–11,000) and water (15 parts) was added and the reactants were stirred together at 100° C. for 2 hours. The temperature was raised to 120° C. and the reactants were stirred together at this temperature for a further 6 hours under a fast stream of nitrogen. The product was obtained as a light brown viscous liquid (75 parts). This is Dispersant 39.

Example 103

[LA (1), δ-Val (10), Gly (3)] PEI (7:1)

Lauric acid (10.02 parts, 0.05M ex. Aldrich), glycolic acid (11.41 parts, 0.15M ex. Fisher Chemicals) and δ-valerolactone (50.06 parts, 0.5M ex. Fluka) were stirred under nitrogen at 160° C. Methane sulphonic acid (0.4 parts ex. Aldrich) was added and the reactants were stirred under nitrogen for 24 hours. After cooling to 120° C., polyethyleneimine (10 parts, SP 200 ex. Nippon Shokhubai) was added and the reactants were stirred under nitrogen for a further 6 hours. The product was obtained as a brown viscous liquid which gave a brown gum on cooling (75 parts). This is Dispersant 40.

Example 104

[LA (1), Gly (3), 7-Me ε-Cap (3), ε-Cap (10)] PEI (13:1)

This was made by a similar process to Dispersant 40 in Example 103 except using lauric acid (5.21 parts, 0.026M), glycolic acid (5.94 parts, 0.078M), 7-methyl ε-caprolactone (10 parts, 0.078M, Lactone 2), ε-caprolactone (29.7 parts, 0.078M), methane sulphonic acid (0.25 parts) and PEI (3.8 parts). The product was obtained as a brown viscous liquid (51 parts). This is Dispersant 41.

Example 105

[LA (1), Gly (3), ε-Val (3), ε-Cap (10)] PEI (17:1)

This was made by the same process as that described in Example 104 except using δ-valerolactone (7.82 parts, 0.078M) in place of the 7-methyl ε-caprolactone and also using 2.78 parts PEI. The product, Dispersant 42, was obtained as a brown viscous liquid (47 parts).

Examples 106 to 109

The solubility of Dispersants 39 to 42 was examined as described in Examples 62 to 100. The fluidity of dispersions of Monolite Rubine 38 was likewise evaluated as described in these examples. The results are given in Table 5 below.

TABLE 5

| Example | Dispersant | Dispersion Viscosity | Solubility at 4° C. |
|---|---|---|---|
| 106 | 39 | C | Clear |
| 107 | 40 | B/C | Clear |
| 108 | 41 | B/C | Clear |
| 109 | 42 | B | Clear |
| Control 2 | — | D/E | — |

Footnote to Table 5
Control 2 is as explained in the footnote to Table 4.

Example 110

Do (1), Gly (3), ε-Cap (10)

Dodecanol (10 parts, 0.054M ex. Aldrich), glycolic acid (12.24 parts, 0.161M ex. Aldrich) and ε-caprolactone (61.25 parts, 0.54M ex. Aldrich) were stirred at 140° C. under nitrogen. Methane sulphonic acid (0.3 parts ex. Adrich) was added and the reactants were stirred at 165° C. for 4 hours followed by 20 hours at 175–80° C. The product was obtained as a clear liquid which gave a beige wax on cooling (77 parts). This is Intermediate 25.

Example 111

(Do (1), Gly (3), ε-Cap (10)) 3:1 Phosphorus Atom

Intermediate 25 (77 parts ex. Example 110) was stirred with polyphosphoric acid (5.64 parts, 83% $P_2O_5$ ex. Fluka)

at 90–95° C. for 6 hours under nitrogen. The product was obtained as a clear liquid which gave a beige wax on cooling (80 parts). This is Dispersant 43.

Dispersant 43 (2 parts) was dissolved in a 4:1 mixture of methoxypropylacetate/n-butanol (10 parts) with heating as necessary. After storage for 72 hours at 4° C. the solution remained clear. In comparison, when Dispersant 43 was replaced by an equal amount of a dispersant which is the phosphate ester of a polyester derived from 1 mole dodecanol and 12 moles ε-caprolactone, crystals were present after storage.

Example 112

Dispersant 43 (0.2 parts) was dissolved in a 4:1 mixture of methoxypropylacetate/n-butanol (2.3 parts) in an 8 dram glass vial containing 3 mm diameter glass beads (17 parts). Titanium dioxide (7.5 parts Tioxide TR92 ex. ICI) was added and the vial shaken on a horizontal shaker for 16 hours. The viscosity of the resultant dispersion was assessed using an arbitrary scale A to E as explained in the footnote to Table 4.

Similar dispersions were prepared using Dispersant 43 (0.25 parts), solvent mixture (6.75 parts) and red iron oxide pigment (3 parts, Sicotrans Red L2817).

The results are given in Table 6 below.

TABLE 6

| Example | Dispersant | Viscosity for TR 92 | Viscosity for L2817 |
|---------|------------|---------------------|---------------------|
| 112 | 43 | A | B |
| Control 1 | — | B/C | C |
| Control 2 | — | E | D |

Footnote to Table 6
Control 1 is the phosphate ester of Do (1) ε-cap (12) 3:1 ratio with phosphorus atom.
Control 2 contains no dispersant and where the amount of dispersant is replaced by the same amount of solvent mixture.

What is claimed is:
1. A dispersant of formula (1) or salt thereof:

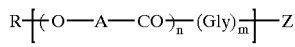 (1)

wherein

R represents a polymerization terminating group selected from the group consisting of the residue of a saturated or unsaturated $C_{1-25}$ aliphatic carboxylic acid group, the residue of a halogen or $C_{1-4}$ alkoxy substituted saturated or unsaturated $C_{1-25}$ aliphatic carboxylic acid group, and the residue of a saturated or unsaturated $C_{1-35}$ linear or branched alcohol;

Z represents an acid group or a moiety having an acidic group selected from the group consisting of sulphate, sulphonate, phosphate and phosphonate group;

A represents $C_3$–$C_7$-alkylene or said alkylene substituted by at least one $C_1$–$C_8$-alkyl group;

Gly represents oxymethylenecarbonyl;

n represents a positive integer;

m represents a positive integer; and the ratio m:n is from 30:1 to 1:6; and the molecular weight of R—[—(O-A-CO)$_n$(Gly)$_m$-]- is from 600 to 3000.

2. A dispersant as claimed in claim 1 wherein the sum of n+m is from 2 to 20.

3. A dispersant as claimed in claim 1 wherein —(O-A-CO)— is derived from ε-caprolactone optionally substituted by one or more $C_{1-8}$-alkyl groups or δ-valerolactone.

4. A dispersant as claimed in claim 3 wherein the alkyl substituent of ε-caprolactone is $C_{1-4}$-alkyl.

5. A dispersant as claimed in claim 1 wherein the ratio of n:m is between 10:1 and 1:5.

6. A dispersant as claimed in claim 5 wherein the alkyl substituent is methyl.

7. A composition comprising a particulate solid and a dispersant as claimed in claim 1.

8. A dispersant comprising a dispersant as claimed in claim 1, a particulate solid and an organic medium.

9. A dispersion as claimed in claim 8 wherein the organic medium is a polar organic liquid.

10. A mill-base comprising a dispersant as claimed in claim 1, a particulate solid and a film-forming resin.

11. A paint or ink comprising a dispersant as claimed in claim 1.

* * * * *